US010820080B2

(12) United States Patent
Gu

(10) Patent No.: US 10,820,080 B2
(45) Date of Patent: Oct. 27, 2020

(54) RECEIVER MODULE

(71) Applicant: AAC Technologies Pte. Ltd., Singapore (SG)

(72) Inventor: Xiaojiang Gu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/529,757

(22) Filed: Aug. 1, 2019

(65) Prior Publication Data

US 2020/0053445 A1 Feb. 13, 2020

(30) Foreign Application Priority Data

Aug. 10, 2018 (CN) .......................... 2018 1 0911896

(51) Int. Cl.

| | |
|---|---|
| ***H04M 1/20*** | (2006.01) |
| ***H04R 1/02*** | (2006.01) |
| ***H04R 1/04*** | (2006.01) |
| ***H04R 1/22*** | (2006.01) |

(52) U.S. Cl.

CPC ............... *H04R 1/026* (2013.01); *H04R 1/04* (2013.01); *H04R 1/222* (2013.01)

(58) Field of Classification Search

CPC . H04R 7/18; H04R 7/04; H04R 7/127; H04R 7/20; H04R 2207/021; H04R 2307/207; H04R 7/06; H04R 9/06; H04R 7/16; H04R 31/003; H04R 1/04; H04R 9/025; H04M 1/20; H04M 1/6033

See application file for complete search history.

(56) References Cited

U.S. PATENT DOCUMENTS

| | | | | | |
|---|---|---|---|---|---|
| 2012/0155696 | A1* | 6/2012 | Zhang .................... | H04R 9/025 381/412 |
| 2014/0119592 | A1* | 5/2014 | Choi ...................... | H04R 9/025 381/412 |
| 2014/0294225 | A1* | 10/2014 | Ji .......................... | H04R 1/023 381/386 |

* cited by examiner

*Primary Examiner* — Amir H Etesam

(74) *Attorney, Agent, or Firm* — W&G Law Group LLP

(57) ABSTRACT

The present disclosure provides a receiver module. The receiver module includes a receiver and a microphone. The receiver includes a holder, a vibration unit, a magnetic circuit unit, a front cover covering the holder and a cover plate. The vibration unit includes a diaphragm spaced apart from the cover plate to form a front cavity. The holder includes a holder body portion, a holder extension portion and a first through-hole. The front cover includes a front cover body portion, a front cover extension portion and a second through-hole. The microphone is fixed on a surface of the holder extension portion facing away from the cover plate. The front cavity, the second through-hole, the first through-hole and a sound inlet hole of the microphone communicate with one another. The microphone share the front cavity with receiver to absorb noise of the receiver, providing better sound effect.

7 Claims, 4 Drawing Sheets

RECEIVER MODULE

TECHNICAL FIELD

The present disclosure relates to the technical field of acoustic-electric conversion, and particularly, to a receiver module applied to a portable communication device.

BACKGROUND

With the rapid development of science and technology, people are pursuing a higher life quality, while raising higher requirements on portable multimedia audio-visual devices, such as notebook computers, mobile phones and those used as important terminal devices in daily life, particularly on the performance of their sound effects. Therefore, there is a higher and higher requirement on a receiver used as an important component for converting electrical signals into sound.

The receiver in the related art includes a holder having an receiving space, a vibration unit and a magnetic circuit unit fixedly held by the holder, a front cover covering the holder, and a cover plate stacked at a side of the front cover facing away from the holder. The vibration unit includes a diaphragm interposed between the holder and the front cover, and the cover plate is spaced apart from the diaphragm to form a front cavity. However, the receiver in the related art causes noise during communicating, which affects the sound effect.

Therefore, it is urgent to provide an improved receiver module, in order to solve the above problem.

BRIEF DESCRIPTION OF DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
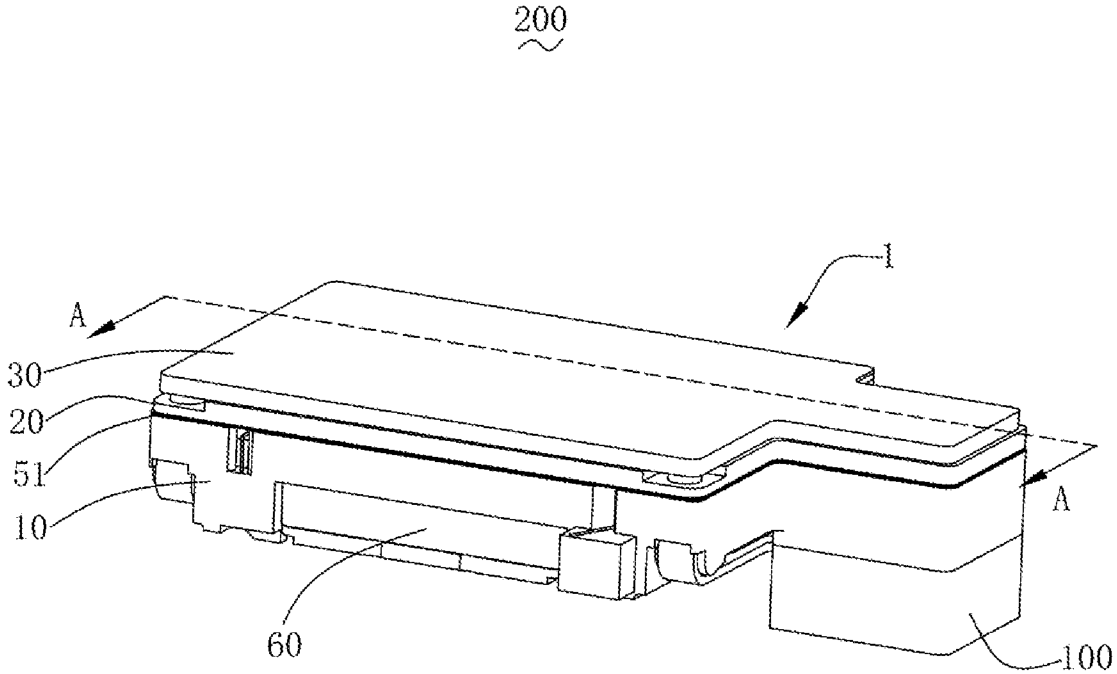
FIG. 1 is a schematic diagram showing a three-dimensional assembly structure of a receiver module provided by the present disclosure.
Figure 2:
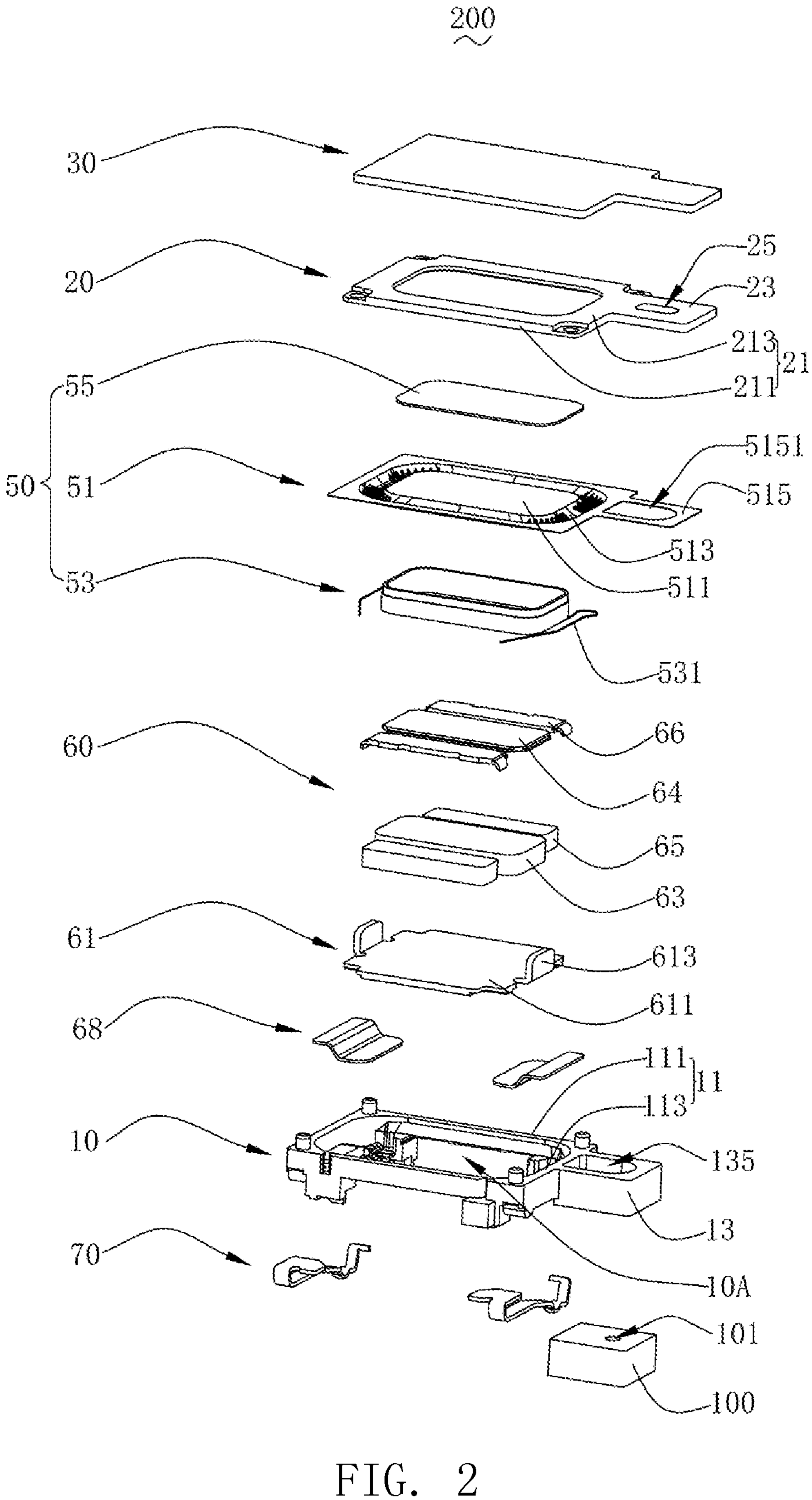
FIG. 2 is a schematic diagram showing a three-dimensional exploded structure of the receiver module of FIG. 1.
Figure 3:
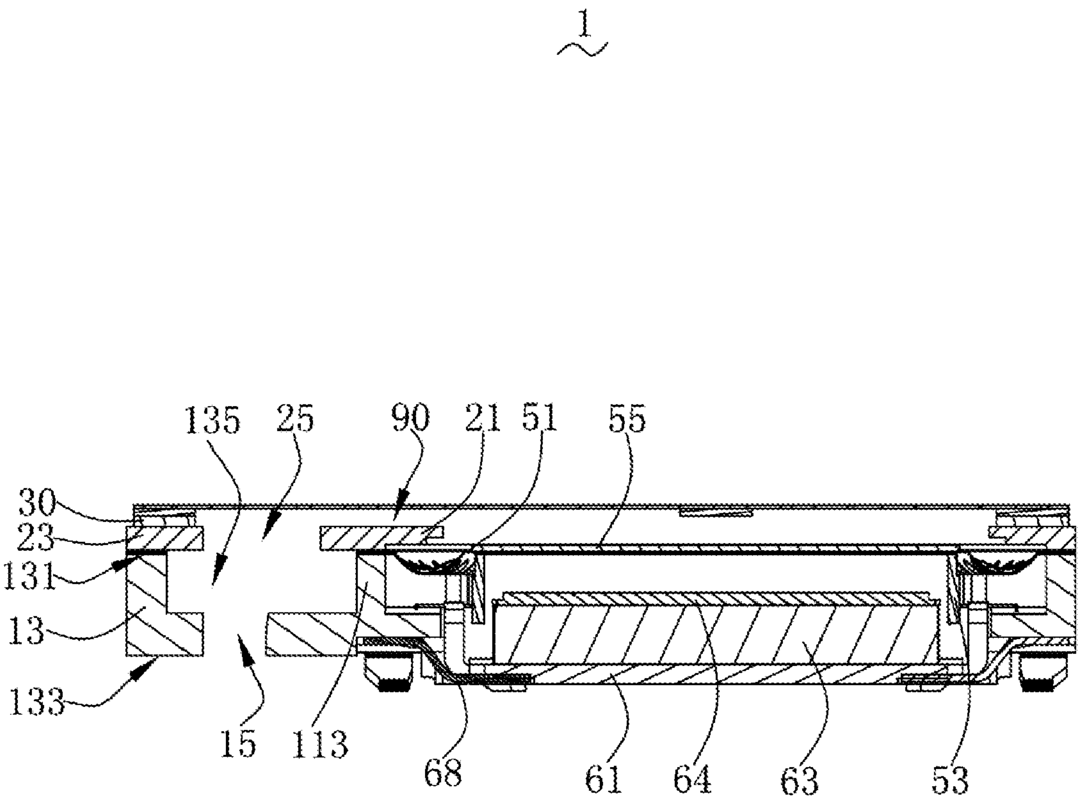
FIG. 3 is a cross-sectional view of the receiver of FIG. 1 taken along line A-A.
Figure 4:
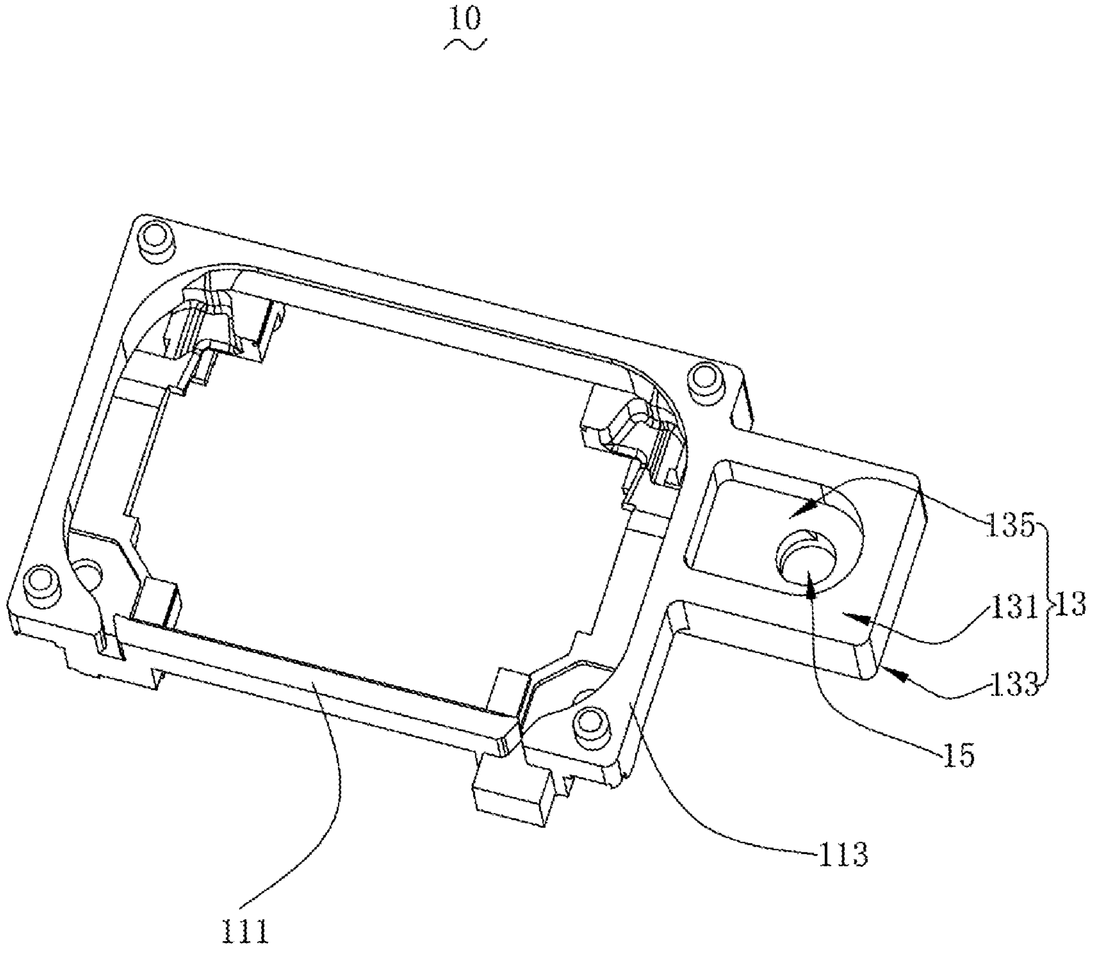
FIG. 4 is a schematic diagram showing a three-dimensional structure of a holder in the receiver of FIG. 1.

As shown in FIG. 1 to FIG. 4, an embodiment of the present disclosure provides a receiver module 200. The receiver module 200 includes a receiver 1 and a microphone 100 fixedly connected to the receiver 1. The microphone 100 has a sound inlet hole 101 communicating with a front cavity of the receiver 1. That is, the microphone and the receiver share the front cavity, so that the microphone can absorb communication noise in the receiver and improve the sound effect of the receiver module.

The receiver 1 includes a holder 10 having an receiving space 10A, a front cover 20 covering the holder 10, a cover plate 30 stacked on a side of the front cover 20 facing away from the holder 10, a vibration unit 50 and a magnetic circuit unit 60 fixedly held by the holder 10, and a conductive terminal 70 for electrically connecting the vibration unit 50 and an external circuit. The vibration unit 50 includes a diaphragm 51 interposed between the front cover 20 and the holder 10, and the cover plate 30 is spaced apart from the diaphragm 51 to form a front cavity 90.

The holder 10 includes a holder body portion 11 enclosing the receiving space 10A, a holder extension portion 13 extending from the holder body portion 11 in a direction facing away from the receiving space 10A, and a first through-hole 15 provided in the holder extension portion 13.

The holder body portion 11 includes a pair of long side walls 111 that are disposed opposite to each other, and a pair of short side walls 113 that are disposed opposite to each other. The two long side walls 111 and the two short side walls 113 are connected end to end to form a rectangular ring structure. The holder extension portion 13 is formed by extending from one of the short side walls 113 in a direction facing away from the receiving space 10A, and the holder body portion 11 is integrally formed with the holder extension portion 13.

The holder extension portion 13 includes an upper surface 131 facing the front cover 20, a lower surface 133 disposed opposite to the upper surface 131, and a groove 135 recessed from the upper surface 131 towards the lower surface 133. The first through-hole 15 penetrates through a groove bottom of the groove 135. The microphone is mounted on the lower surface 133.

In the present embodiment, the first through-hole 15 is a circular through-hole.

The front cover 20 includes a front cover body portion 21 covering the holder 10, a front cover extension portion 23 that extends from the front cover body portion 21 and covers the holder extension portion 13, and a second through-hole 25 provided in the front cover extension portion 23. Two ends of the second through-hole 25 communicate with the front cavity 90 and the first through-hole 15, respectively. In the present disclosure, the structure of the holder 10 is improved in such way that the holder 10 includes the holder body portion 11 enclosing the receiving space and the holder extension portion 13 extending from the holder body portion 11, the microphone is mounted on the lower surface of the holder extension portion 13, the holder extension portion 13 and the front cover extension portion 23 corresponding to the holder extension portion 13 are provided with the first through-hole 15 and the second through-hole 25 respectively. In such structure, air in the front cavity 90 of the receiver 1 is guided out to a sound inlet hole 101 of the microphone 100, such that the noise is absorbed by the microphone and the sound effect is improved.

The front cover body portion 21 includes a pair of long side edges 211 that are disposed opposite to each other, and a pair of short side edges 213 that are disposed opposite to each other, and the two long side edges 211 and the two short side edges 213 are connected end to end to form a rectangular ring structure. The long side edges 211 are correspondingly connected to the long side walls 111, and the short side edges 213 are correspondingly connected to the short side walls 113. The front cover extension portion 23 is formed by extending horizontally from one of the short side edges along a direction facing away from the other one of the short side edges.

In the present embodiment, the second through-hole 25 is arranged to correspond to the groove 135.

In an embodiment, the first through-hole 15 has a smaller size than the second through-hole 25, and the second through-hole 25 has a smaller size than an opening of the groove 135.

In an embodiment, an orthographic projection of the second through-hole 25 on the groove bottom of the groove 135 completely falls within the groove bottom of the groove 135, and an orthographic projection of the first through-hole 15 on the front cover extension portion 23 of the front cover 20 completely falls within the second through-hole 25.

In the present embodiment, the groove bottom of the groove 135 and the lower surface 133 are parallel to each other and are both flat surfaces.

The vibration unit 50 further includes a voice coil 53 located below the diaphragm 51 and configured to drive the diaphragm 51 to vibrate to sound, and a dome 55 configured to intensify the vibration of the diaphragm 51.

The diaphragm 51 includes a vibrating portion 511 at the middle position, a suspension portion 513 surrounding the vibrating portion 511, and a fixing portion 515 extending from a peripheral edge of the suspension portion 513. The fixing portion 515 is interposed between the holder 10 and the front cover 20 and provided with a third through-hole 5151 at a position corresponding to the groove 135. Two ends of the third through-hole 5151 communicate with the second through-hole 25 and the groove 135, respectively. In the present embodiment, the third through-hole 5151 has the same shape as the opening of the groove 135.

The dome 55 is attached on a surface of the vibrating portion 511 close to the cover plate 30.

The magnetic circuit unit 60 includes a yoke 61 buckled and held at the bottom of the holder 10, a main magnetic steel 63 fixed at a central position of the yoke 61, a main pole plate 64 attached on a surface of the main magnet 63 facing the diaphragm 51, auxiliary magnets 65 disposed at two sides of the yoke 61, an auxiliary pole plate 66 attached on a surface of the auxiliary magnet 65 facing the diaphragm 51, and damping sheets 68.

The yoke 61 includes a bottom plate 611, and side plates 613 extending from two ends of the bottom plate 611 in a direction towards the diaphragm 51. The main magnet 63 is spaced apart from each of the side plates 613 and the auxiliary magnetic steels 65 so as to form magnetic gaps, in which the voice coil 53 is inserted.

The bottom plate 611 further includes mounting portions recessed from a surface of the bottom plate 611 facing away from the front cover 20 in a direction towards the diaphragm 51, and the mounting portions are symmetrically disposed at two ends of the bottom plate 611. One end of the damping sheet 68 is connected to the mounting portion, and the other end of the damping sheet 68 is fixedly connected to a surface of the short side wall 13 of the holder 10 facing away from the diaphragm 51. The damping sheet 68 can shield a leaking portion between the holder 10 and the yoke 61 and provides a dustproof function. Further, since the air in the inner cavity may be compressed when the diaphragm 51 is vibrating, the damping sheet functions to buffer the compressed air to a certain extent, thereby improving acoustic resistance of the product and thus improving the acoustic performance of the product.

The conductive terminal 70 is configured to be electrically connected to an external circuit. In the present embodiment, two conductive terminals 70 are provided, and the two conductive terminals 70 are symmetrically mounted below the short side walls 13 of the holder 10 and fixedly connected to the short side walls 13. The voice coil 53 is electrically connected to the conductive terminals 70 through a voice coil lead wire 531 of the voice coil 53.

The receiver module provided by the present disclosure includes the receiver and the microphone fixedly connected to the receiver; the holder of the receiver includes the holder body portion enclosing the receiving space, the holder extension portion that extends from the holder body portion in the direction facing away from the receiving space, and the first through-hole provided in the holder extension portion; the front cover of the receiver includes the front cover body portion covering the holder body portion, the front cover extension portion that extends from the front cover body portion and covers the holder extension portion, and a second through-hole provided in the front cover extension portion; the microphone is mounted at the surface of holder extension portion facing away from the front cover; the front cavity, the second through-hole, the first through-hole and the sound inlet hole of the microphone communicate with one another, i.e., the receiver and the microphone share the front cavity, and in this regard, the air in the front cavity is led to a back side of the receiver facing away from the front cavity via the second through-hole and the first through-hole, and then is absorbed by the microphone. In this way, the noise is eliminated, the sound effect of the receiver module is improved.

It should be noted that, the above are merely embodiments of the present disclosure, any improvement, which is made by those skilled in the art without departing from the inventive concept of the present disclosure, shall fall within the protection scope of the present disclosure.

What is claimed is:

1. A receiver module, comprising:

a receiver; and a microphone, wherein the receiver comprises:

a holder having an receiving space;

a vibration unit fixedly held by the holder;

a magnetic circuit unit fixedly held by the holder;

a front cover covering the holder; and a cover plate stacked on a side of the front cover facing away from the holder, wherein the vibration unit comprises a diaphragm interposed between the holder and the front cover, and the cover plate is spaced apart from the diaphragm to form a front cavity, the holder comprises a holder body portion enclosing the receiving space, a holder extension portion extending from the holder body portion in a direction facing away from the receiving space, and a first through-hole provided in the holder extension portion, the front cover comprises a front cover body portion covering the holder body portion, a front cover extension portion extending from the front cover body portion and covering the holder extension portion, and a second through-hole provided in the front cover extension portion, the holder extension portion comprises an upper surface facing the front cover, a lower surface arranged opposite to the upper surface, and a groove formed by recessing from the upper surface towards the lower surface, the first through-hole penetrates through a groove bottom of the groove, two ends of the groove communicate with the first through-hole and the second through-hole, respectively, and the groove bottom is parallel to both the upper surface and the lower surface, the microphone is mounted on the lower surface, the front cavity, the second through-hole, the first through-hole and a sound inlet hole of the microphone communicate with one another, and air in the front cavity is guided out to a back side of the receiver facing away from the front cavity via the second through-hole and the first through-hole and is absorbed by the microphone to eliminate noise.

2. The receiver module as described in claim 1, wherein the holder body portion comprises two long side walls arranged opposite to each other and two short side walls arranged opposite to each other, the two long side walls and the two short side walls being connected end to end to form a rectangular ring structure, and the holder extension portion is formed by extending from one of the two short side walls in a direction facing away from the receiving space.

3. The receiver module as described in claim 2, wherein the holder body portion is integrally formed with the holder extension portion.

4. The receiver module as described in claim 3, wherein the first through-hole has a smaller size than the second through-hole, and the second through-hole has a smaller size than an opening of the groove.

5. The receiver module as described in claim 4, wherein an orthographic projection of the second through-hole on the groove bottom of the groove falls within the groove bottom of the groove, and an orthographic projection of the first through-hole on the front cover extension portion falls within the second through-hole.

6. The receiver module as described in claim 4, wherein the first through-hole is a circular through-hole.

7. The receiver module as described in claim 3, wherein the diaphragm comprises a vibrating portion at a central position, a suspension portion surrounding the vibrating portion, and a fixing portion extending from a peripheral edge of the suspension portion, and wherein the fixing portion is interposed between the holder and the front cover and is provided with a third through-hole at a position corresponding to the groove, and the third through-hole has a same shape as an opening of the groove and communicates the second through-hole with the groove.

* * * * *